United States Patent

[11] 3,609,561

| [72] | Inventor | Hubert A. Riester<br>Huntington Valley, Pa. |
|---|---|---|
| [21] | Appl. No. | 14,489 |
| [22] | Filed | Feb. 26, 1970 |
| [45] | Patented | Sept. 28, 1971 |
| [73] | Assignee | Fischer & Porter Company<br>Warminster, Pa. |

[54] ELECTRONIC PROCESS CONTROLLER WITH SINGLE DIFFERENTIAL AMPLIFIER RESPONSIVE TO EITHER ANALOG OR DIGITAL SIGNALS
7 Claims, 4 Drawing Figs.

[52] U.S. Cl.................................................. 328/69,
328/1, 328/70, 330/51, 330/69
[51] Int. Cl...................................................... H03k 17/00
[50] Field of Search........................................... 328/69–71,
127, 142, 1; 307/229; 235/150.1, 150.2, 151,
151.1; 330/51, 69, 30 D

[56]  References Cited
UNITED STATES PATENTS

| Re. 26,573 | 4/1969 | Nazareth, Jr. | 330/51 X |
| 3,290,563 | 12/1966 | Hyer et al. | 330/51 X |
| 3,441,836 | 4/1969 | Riley | 328/69 X |
| 3,501,707 | 3/1970 | Richardson | 330/51 X |
| 3,526,839 | 9/1970 | Schmoock et al. | 328/1 |

Primary Examiner—Stanley D. Miller, Jr.
Attorney—Michael Ebert

ABSTRACT: An electronic controller which is responsive to either analog or digital signals to operate a final control element in a process control loop, the controller acting in conjunction with other devices to maintain a process variable at a desired value. The controller includes a single amplifier adapted to function in conjunction with an appropriate feedback network to create an interface between a direct digital control system and to afford supplemental switching to effect either digital control, automatic analog control or manual control of the final control element.

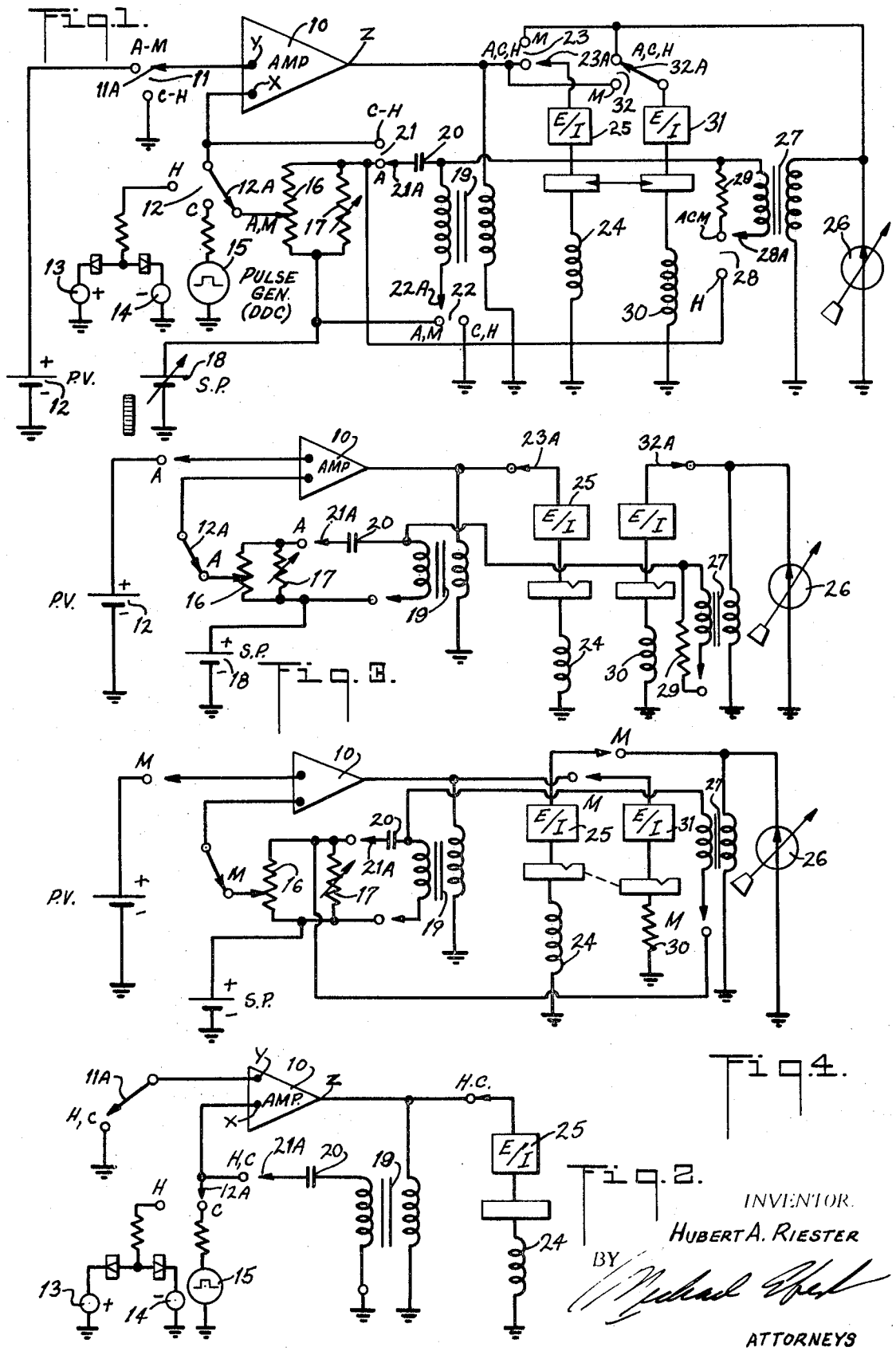

ELECTRONIC PROCESS CONTROLLER WITH SINGLE DIFFERENTIAL AMPLIFIER RESPONSIVE TO EITHER ANALOG OR DIGITAL SIGNALS

BACKGROUND OF INVENTION

This invention relates generally to electronic controllers for process control loops, and more particularly to a controller responsive to analog or digital input signals for operating a final control element.

An electronic controller is a component in a process control loop which is subject to disturbances, the controller acting in conjunction with other devices to maintain a process variable at a desired value. To accomplish this purpose, the controller receives, in terms of electrical values, both the desired or set point value and the process variable, the controller functioning to operate a final control element which directly or indirectly governs the process variable.

The factor controlled may be flow rate, pressure, viscosity, liquid level, or any other process variable. Thus the input signal of the controller may be derived from a rate-of-flow meter whose reading is translated into a corresponding electrical value. The output of the controller may be impressed on a flow-regulating valve, which valve is opened or closed or is caused to assume an intermediate position as determined by the controller. The specific nature of the process variable and the final control element is not the concern of the present invention, which is applicable to all forms thereof.

Modern electronic controllers must be capable of operating in response to analog or digital input signals. In standard analog operation, the value of the process variable (PV) is obtained as an analog signal from a sensor and is compared with an analog signal representing the set point (SP) to produce a deviation or error signal which, when applied to the controller, causes a change in output current that is a function of the error, the output current acting on the final control element to reduce the deviation.

In order to maintain automatic control over a large number of essentially analog control loops, it is now the practice to employ a direct digital control technique (DDC) wherein the various analog process variable signals are scanned, the scanner passing the information to an analog-to-digital converter that holds the resultant digital values in a buffer until called for by the computer. The computer does whatever it is programmed to do with respect to the value it receives, and it yields a control command to a multiplexer that directs the command to the appropriate process controller. The average process control digital computer has the capacity to handle a great many such loops together with incidental or subsidiary chores, especially the handling of online emergency situations.

Thus a modern electronic process controller must be adapted to respond not only to PV and SP signals in analog form, but also to digital pulse commands from a digital computer. In addition to these requirements, the electronic controller must be capable of being manually operated for control purposes or in the event there is a failure in the automatic analog or DDC system.

Existing electronic controller circuits which are capable of operating in the various modes dictated by modern requirements are relatively elaborate in design, for they involve at least two amplifiers, one for handling analog signals and the other for handling digital signals. As a consequence, such circuits are complex and expensive. Moreover, conventional systems are not adapted to provide a smooth transition in transferring from one mode to another. Hence, when switching, say, from the DDC mode to automatic analog operation, there may be a wide disparity between the existing settings of the DDC and analog systems, so that the process is compelled to undergo an abrupt transitional change.

SUMMARY OF INVENTION

In view of the foregoing, it is the main object of this invention to provide an electronic controller for a process loop, which controller includes a single amplifier for both digital or analog control.

More particularly, it is an object of the invention to provide a controller of the above type in which the single amplifier operates in conjunction with appropriate feedback-switching means to create an interface between a DDC system and a final control element and to afford supplemental switching to effect either digital control, automatic analog control or manual control for the final control element.

A significant feature of the invention is that the single amplifier functions either as a holding amplifier receiving pulses from the DDC computer or an operational amplifier computing proportional and reset values as a function of the deviation between PV and SP values when in the automatic analog mode.

Also, an object of the invention is to provide an electronic controller capable of selectively operating in any one of four distinct modes, the switchover from one mode to another being effected without an abrupt transition in output conditions.

A further object of the invention is to provide a controller of the above-described type which involves the use of but a single differential amplifier and which is relatively inexpensive, the controller being efficient and reliable in operation.

Briefly stated, these objects are accomplished in an electronic controller which includes a differential amplifier having a pair of inputs and a common output, the output voltage of the amplifier being applied through a voltage-to-current converter to a final control element to vary the setting thereof as a function of the input signals. The output is fed back to one of the inputs through an isolator and a holding/reset capacitor which is charged by the output voltage.

Switching means are provided to render the system operative in any one of several modes. In the automatic analog mode, analog voltages representative of the process variable and the set point are applied to the inputs, and resistors are combined with the capacitor to obtain a proportional and reset action to control the final control element accordingly. In the DDC mode, the pulses from a computer are fed to one of the inputs, the other input being at a fixed level, the charge attained by the capacitor and applied to the one input being determined by the input pulse rate. The charge on the capacitor is held thereon and when switching to another mode, the initial setting of the control element in the new mode is determined by this charge, thereby avoiding an abrupt transitional change.

In the hard manual mode, the final control element is disconnected from the amplifier and is placed under the direct control of a manually adjustable voltage source through a voltage-to-current converter. The amplifier output, however, is connected to a dummy final element, the amplifier being responsive to the PV and SP analog values. The voltage from the hard manual source is also applied to the feedback capacitor in the amplifier circuit so that the charge thereon reflects the setting of the hard manual control; and when switching over from the hard manual mode to another mode, the charge on the capacitor prevents an abrupt transition.

OUTLINE OF DRAWING

For a better understanding of the invention, as well as other objects and further features thereof, reference is made to the following detailed description to be read in conjunction with the accompanying drawing, wherein:

FIG. 1 is a schematic circuit diagram of the electronic controller in accordance with the invention, the controller being operable in any one of four modes, depending on the setting of the selector switches;

FIG. 2 is a diagram of the electronic controller when the selector switches are set for operation in the DDC mode or soft manual mode, all elements of the circuit not involved in this operation being deleted;

FIG. 3 is a diagram of the electronic controller when the selector switches are set for operation in the automatic analog mode, all superfluous elements being omitted; and FIG. 4 is a diagram of the controller when the switches are set for operation in the hard manual mode, superfluous elements being deleted.

DESCRIPTION OF INVENTION

Referring now to FIG. 1, there is shown an electronic controller in accordance with the invention, including a differential amplifier 10. This is the only amplifier entailed, despite the fact that the system is operable in any one of four modes. In practice, the amplifier may be a solid-state device having two differentially connected input stages. There are two input terminals, one positive (noninverting) and one negative (inverting). The output is considered to have a positive polarity. The differential amplifier is designed to be insensitive to common-mode input voltage.

The system is arranged to operate in any one of the following four modes, represented by symbols C, H, A and M.

C-mode is operation under DDC control; that is, by digital pulses generated at a computer, the pulse rate acting to position the final control element in accordance with the computer command.

H-mode refers to "soft" manual control in which digital pulses of the type generated at the computer are simulated, the pulse rate and polarity being manually adjustable.

A-mode refers to automatic analog control in which the final control element is positioned as a function of PV and SP analog voltage values.

M-mode refers to "hard" manual control in which the final control element is under the direct control of a manually adjustable voltage source and in which the controller-amplifier is sidestepped.

As shown in FIG. 1, one input of amplifier 10 is connected through a selector switch 11 whose movable contact 11A is adapted to engage either a fixed contact A-M which goes to the voltage source 12 representing the process variable in analog form, or to a fixed contact C-H going to ground. In practice, this PV voltage is generated by a suitable sensor responsive to the process variable. The symbols applied to the fixed contacts of the various selector switches represent the mode of operation in effect when these contacts are engaged, and when a contact has more than one symbol, this means that the same contact, when engaged, provides any of the operating modes represented by the symbols.

The other input X of amplifier 10 goes to a selector switch 12 whose movable contact 12A is adapted to engage any one of three fixed contacts H, C and A-M. Contact H of switch 12 goes to a simulated digital source constituted by a generator 13 of positive going pulses and a generator 14 of negative-going pulses whereby pulses of either polarity and at a manually adjustable rate may be fed into the related amplifier input during the soft manual mode.

Contact C of switch 12 goes to the DDC computer 15 and, when engaged, feeds the DDC pulses into the associated input of the amplifier. Contact A-M of switch 12 goes to the adjustable slider of a potentiometer 16 shunted across a resistor 17 in a reset network, the lower end of the network being connected to an adjustable voltage source 18 providing a set point (SP) analog value. Thus, when contact A-M of switch 12 is engaged, the SP value is applied through the network to input X of the amplifier.

The output Z of amplifier 10 is coupled to the primary of an isolation transformer 19. One end of the secondary of transformer 19 is coupled through a feedback (holding/reset) capacitor 20 to the movable contact 21A of a selector switch 21 which is adapted to engage a fixed contact A going to the upper end of network 16, 17 or to engage a fixed contact C-H going to input X of amplifier 10. The other end of the secondary of transformer 19 is connected to the movable contact 22A of a selector switch 22 which is adapted to engage a fixed contact A-M going to the lower end of network 16, 17 or a fixed contact C-H going to ground.

Output Z of amplifier 10 is also connected to the fixed contact A-C-H of a selector switch 23 whose movable contact 23A is connected to a final control element 24 through a voltage-to-current converter 25. The final control element may be an electromagnetically operated valve which is caused to travel from its fully closed to fully open position by current flow in the usual range of 4 to 20 milliamperes, intermediate current values producing intermediate valve positions. Converter 25 acts to convert the voltage output of the amplifier to corresponding current values for operating the final control element.

Selector switch 23 also includes a second fixed contact M which, when engaged by movable contact 23A, couples final control element 24 to a "hard manual" potentiometer 26. This potentiometer supplies a voltage of adjustable magnitude to effect direct operation of the final control element through the voltage-to-current converter 25.

The voltage produced by potentiometer 26 is also applied to the primary of an isolation transformer 27. One end of the secondary of this transformer is connected to capacitor 20, the other end being connected to the movable contact 28A of a selector switch 28 to engage a fixed contact A-C-M or a fixed contact H. Fixed contact A-C-M of switch 28, when engaged, shunts a resistor 29 across the secondary of transformer 27. Fixed contact H of switch 28, when engaged, provides a connection to contact A of selector switch 21.

A "dummy" final control element 30 is provided which is equivalent to the working control element 24, the dummy element being connected through a voltage-to-current converter 31 to the movable contact 32A of a selector switch 32. Movable contact 32A is adapted to engage a fixed contact A-C-H going to contact M of selector switch 23 or a fixed contact M going to contact A-C-H of switch 23.

The circuit shown in FIG. 1 is capable of selective operation in the H, C, A and M modes To simplify the functional analysis of this circuit, reference will now be made to FIGS. 2, 3 and 4, which show the circuit arrangements when operating in selected modes, all elements superfluous to the selected mode being omitted.

C- or H-mode Operation

FIG. 2 illustrates the circuit arrangement in either C- or H-mode operation. Since both modes have a digital input, the same arrangement is used for both, the only difference being that in the C-mode, the pulses are derived from DDC computer 15, whereas in the H mode, the pulses are derived from generators 13 and 14. In the C or H mode, switches 11, 21 and 23 engage their respective C-H fixed contact, but switch 12 in the C mode engages the C contact and in the H mode engages the H contact.

In the C or H mode, the input pulses from the DDC digital source or the manually adjustable source are applied to the X input of amplifier 10, the Y input being grounded. These pulses are amplified and serve to charge capacitor 20 in the feedback path leading to input X of the amplifier to a value which is a function of pulse rate. Thus the voltage across the capacitor and applied to input X depends on the digital input command. The resultant voltage developed at output Z is converted into a corresponding current value by converter 25 and acts to vary the final control element 24 accordingly.

A-mode Operation

FIG. 3 illustrates operation in the A mode; that is, an operation wherein final control element 24 acts in response to the relative analog values of PV and SP. In switching over from the C or H mode to the A mode, the charge held on capacitor 20 is now applied to reset resistors 16 and 17.

In an electronic controller loop operating in the proportional mode, there is a continuous linear relationship between the analog value of the controlled variable and the position of the final control element (within the proportional band). In other words, the valve moves the same amount for each unit of deviation. However, proportional-position operation can produce an exact correction for only one load condition; at all other loads, there must also be some deviation left. This offset error is eliminated by a reset action to cause a change in output proportional to the time integral of the actuating signal. (The combined action of proportional and reset is usually called automatic reset.)

Thus, in A-mode operation, capacitor 20 is combined with resistors 16 and 17 to provide an integrating network affording the desired automatic reset action. But since the initial charge on capacitor 20 is determined by the digital pulses when transferring from C- or H-mode operation to A-mode, no bump in output will occur, provided that zero deviation exists between process variable and the set point 18 previously set on the analog controller. If a deviation does exist, the unit simply positions the value at the proportional and reset rates of the analog controller.

M-mode Operation

Referring now to FIG. 4, there is shown the arrangement when operating in the hard manual or M mode. In this case, the signals applied to inputs Y and X of the amplifier are the PV and SP analog voltages as in A-mode operation, but output Z is applied to the dummy final control element 30 rather than to the working final control element.

The working final control element 24 in this mode is connected through selector switch 23 to the hard manual potentiometer 26 and is directly controlled thereby. That is, the voltage established by the potentiometer setting is converted to a corresponding current for driving the final control element in the 4 to 20 milliampere range. However, the voltage across the hard manual system is also fed back through isolation transformer 26 and is applied to capacitor 20 in the feedback path of the amplifier to operate same in accordance with the manual output. Hence, in subsequently going from hard manual to DDC operation, no checking is required for, on manual, the output drives the reset/holding capacitor 20 and the voltage thereacross is presented to the system in DDC operation, operation.

While there has been shown and described a preferred embodiment of an electronic process controller in accordance with the invention, it will be appreciated that many changes and modifications may be made therein without departing from the essential spirit of the invention.

I claim:

1. An electronic controller responsive to digital or analog signals for operating a final control element in a process control loop, said controller comprising:
    A. a differential amplifier having two inputs and a common output which yields an output voltage depending on the difference between the voltages applied to the two inputs;
    B. a reset-holding capacitor coupled to said output to acquire a charge depending on the output voltage:
    C. switching means adapted in one mode to apply digital pulses to one of said amplifier inputs and to also apply thereto the charge established across said capacitor whereby the output voltage of the amplifier is a function of said pulses, and in another mode to apply process variable and set point analog voltages to said two inputs and to couple a resistance network to said capacitor to produce an output voltage which is now a function of the difference between said analog voltages, and
    D. means to convert said output voltage to a corresponding current value and to apply said current to said final control element to adjust same accordingly.

2. A controller as set forth in claim 1, further including an isolation transformer interposed between said capacitor and said amplifier output.

3. A controller as set forth in claim 1, wherein said digital pulses are derived from a direct digital control computer.

4. A controller as set forth in claim 1, wherein said pulses are derived from a source simulating a direct digital control computer.

5. A controller as set forth in claim 1, further including switching means to disconnect said final control element from said amplifier and to apply thereto an operating current derived from a manually controlled voltage source whereby said controller functions in a hard manual mode.

6. A controller as set forth in claim 5, wherein said amplifier output in the hard manual mode is connected to a dummy final control element.

7. A controller as set forth in claim 6, wherein the voltage produced by said source is also applied to said capacitor to charge same.